United States Patent
Tanji

(10) Patent No.: US 8,270,017 B2
(45) Date of Patent: Sep. 18, 2012

(54) NETWORK CARD DEVICE FOR DETERMINING PERMISSIBILITY FOR PROCESSING DATA FROM A DATA SOURCE AND METHOD OF CONTROLLING THE SAME

(75) Inventor: Masamichi Tanji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 949 days.

(21) Appl. No.: 12/334,344

(22) Filed: Dec. 12, 2008

(65) Prior Publication Data

US 2009/0161154 A1 Jun. 25, 2009

(30) Foreign Application Priority Data

Dec. 20, 2007 (JP) ................................. 2007-328728

(51) Int. Cl.
*G06F 3/12* (2006.01)
*G06K 15/00* (2006.01)
(52) U.S. Cl. ..................... 358/1.15; 358/1.14
(58) Field of Classification Search ............... 358/1.1, 358/1.9, 1.12, 1.13, 1.14, 1.15, 474, 500, 358/402; 709/201, 245; 715/274; 379/88.18
See application file for complete search history.

(56) References Cited

U.S. PATENT DOCUMENTS

| | | | | |
|---|---|---|---|---|
| 7,149,816 B1 * | 12/2006 | Port et al. | ....................... | 709/250 |
| 7,162,518 B2 * | 1/2007 | Takahashi | ....................... | 709/217 |
| 7,581,033 B2 * | 8/2009 | Ebersole et al. | ............... | 709/250 |
| 7,689,596 B2 * | 3/2010 | Tsunoda | ....................... | 358/1.15 |
| 2005/0015498 A1 * | 1/2005 | Okazawa et al. | ............. | 709/227 |
| 2006/0224774 A1 * | 10/2006 | Tanji | ............................. | 709/245 |

FOREIGN PATENT DOCUMENTS

| | | |
|---|---|---|
| JP | 2005-038011 | 2/2005 |
| JP | 2005-354410 | 12/2005 |

* cited by examiner

*Primary Examiner* — Gabriel Garcia
(74) *Attorney, Agent, or Firm* — Canon U.S.A., Inc., IP Division

(57) ABSTRACT

A communication device, having a first connecting unit for connecting to a network and a second connecting unit for connecting to an information processing apparatus, receives data from the network through the first connecting unit. The device includes a processing unit that processes the received data and a rejection information registering unit that registers rejection information indicating a specific source, wherein the communication device is not allowed to process data received from the specific source. When receiving data, the device determines whether information indicating a source of the received data is registered in the rejection information registering unit. When determining that the information indicating the source of the received data is not registered, the device transmits confirmation data to the information processing apparatus through the second connecting unit, and allows the processing unit to process the received data in accordance with the result of transmission of the confirmation data.

23 Claims, 8 Drawing Sheets

| IP ADDRESS 301 | MAC ADDRESS 302 |
|---|---|
| 192.168.0.10 | 00:0a:0b:0c:0d:0e |
| 192.168.0.20 | 00:0f:0e:0d:0c:0b |
| ⋮ | ⋮ |

| IP ADDRESS 401 | MAC ADDRESS 402 |
|---|---|
| 192.168.10.200 | 00:01:02:03:04:05 |
| 192.168.10.201 | 00:09:08:07:06:05 |
| ⋮ | ⋮ |

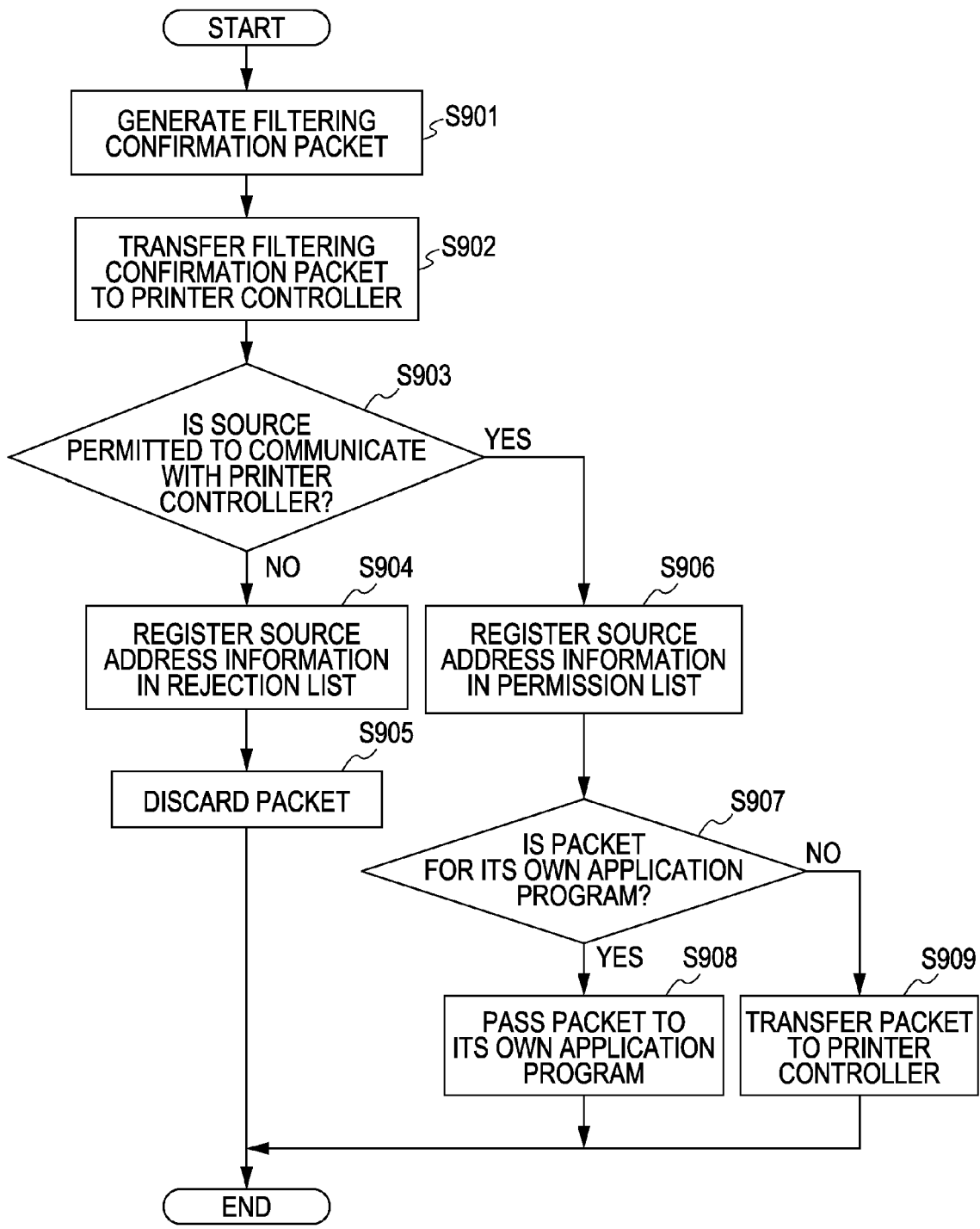

NETWORK CARD DEVICE FOR DETERMINING PERMISSIBILITY FOR PROCESSING DATA FROM A DATA SOURCE AND METHOD OF CONTROLLING THE SAME

BACKGROUND OF THE INVENTION

1. Field of the Invention

The present invention generally relates to a communication device connected to a network and an information processing apparatus, and a method of controlling the communication device. The invention may also generally relate to a storage medium and a program having computer-executable instructions for performing the method.

2. Description of the Related Art

In a network environment, there are often many printers having different functions and capabilities. In this case, the following issue may arise: some of the newer printers in the network environment may support a secure printing function, while the older printers do not.

According to a proposed approach, a network card device connectable to an existing printer through an interface may be used. The network card device is capable of adding a function to the existing printer.

Japanese Patent Laid-Open No. 2005-038011 discloses an intelligent network card device including a CPU. This network card device is used while being connected to the main body of a printer. Typically, the network card device supports a print server function for performing centralized control of various print services via a network. The printer communicates with the network card device through an interface to provide a service.

In some cases, the network card device uses the same network address (e.g., IP address) as that of the printer. In this case, the network card device is disposed at the front end of the printer as viewed from the network side. The printer and the network card device are recognized as a single communication apparatus by other communication apparatuses existing on the network.

Accordingly, a service, such as the print server function, supported by the network card device, can be recognized as an expanded service added to the printer itself. Furthermore, existing services, which are not provided by the network card device and are originally supported by the printer, can function as before without being affected by the presence of the network card device.

In addition, to achieve the above-described provision of services, the network card device has a function of, when receiving a communication packet from another communication apparatus existing on the network, determining whether the packet relates to a service supported by the network card device itself.

When determining that the received packet relates to the service supported by the network card device, the device processes the packet by itself to execute the service related to the packet. Whereas, when the received packet does not relate to any service supported by the network card device, the device transfers the packet to the printer through the interface. The printer executes a service related to the transferred packet.

In recent years, printers having a filtering function for communication have been developed. According to the filtering function, filtering information is previously registered in the printer by a user, such as a network administrator. When the printer receives a communication packet from a communication partner which matches the description of the filtering information, the packet is discarded by the filtering function. Alternatively, the filtering function allows the printer to receive a communication packet from a communication partner which matches the description of the registered filtering information and discards a communication packet sent from another communication partner. The filtering information can be set through an operation panel provided for the printer.

Typically, either or both of a physical address and a network address are used as the above-described filtering information. More specifically, in the TCP/IP protocol, a media access control (MAC) address is used as the physical address and an IP address is used as the network address.

It is assumed that the above-described network card device is attached to a printer which denies access to a service supported by the printer from a predetermined communication apparatus existing on the network using the above-described filtering function. In this case, since the network card device is positioned at the front end of the printer as described above, the filtering function is not applied to a service supported by the network card device itself.

Thus, the communication apparatus which is denied access to a service supported by the printer may nonetheless be able to access a service supported by the network card device.

A method for allowing the network card device to have a filtering function that is similar to that of the printer has been proposed. In this case, however, the user may have to again set similar filtering information in the network card device in the same way as in the printer.

Accordingly, in some cases, the user may have to previously grasp the filtering information in the printer. Alternatively, the user may have to set filtering information, having the same description as that of the filtering information in the printer, in the network card device with reference to the filtering information in the printer. Such a setting operation may be complicated for the user. Also, in some cases, a setting error may easily occur. In addition, the network card device may have to include a unit, such as an operation panel, in order to set filtering information in the same case as the printer.

A method disclosed in Japanese Patent Laid-Open No. 2005-354410 has also been proposed. Specifically, according to the method disclosed in Japanese Patent Laid-Open No. 2005-354410, a host located at the back end communicates with a router at the front end using a predetermined multicast address. During communication therebetween, the host transmits filtering information set therein to the router. The router receives the filtering information and sets the information therein.

To realize the above-described method, the host may have to have a function of notifying the router of the filtering information set in the host using the predetermined multicast address. Accordingly, when a host without the above-described function and a router are used in combination, it may be necessary to individually set filtering information.

SUMMARY OF THE INVENTION

According to an aspect of the present invention, there is provided a communication device having a first connecting unit configured to connect to a network and a second connecting unit configured to connect to an information processing apparatus, the device including a receiving unit configured to receive data from the network through the first connecting unit, a processing unit configured to process the data received by the receiving unit, a rejection information registering unit configured to register rejection information indicating a specific source, wherein the communication device is not allowed to process data received from the specific source, a determining unit configured to, when the receiving unit receives data, determine whether information indicating a source of the received data is registered in the rejection information registering unit, a transmitting unit configured to, when the determining unit determines that the information indicating the source of the received data is not registered in the rejection information registering unit, transmit confirmation data to the information processing apparatus through the second connecting unit, and a control unit configured to allow the processing unit to process the received data in accordance with the result of transmission of the confirmation data by the transmitting unit.

According to another aspect of the present invention, there is provided a communication device having a first connecting unit configured to connect to a network and a second connecting unit configured to connect to an information processing apparatus, the device including a receiving unit configured to receive data from the network through the first connecting unit, a processing unit configured to process the data received by the receiving unit, a permission information registering unit configured to register permission information indicating a specific source, wherein the communication device is allowed to process data received from the specific source, a determining unit configured to, when the receiving unit receives data, determine whether information indicating a source of the received data is registered in the permission information registering unit, a transmitting unit configured to, when the determining unit determines that the information indicating the source of the received data is not registered in the permission information registering unit, transmit confirmation data to the information processing apparatus through the second connecting unit, and a control unit configured to allow the processing unit to process the received data in accordance with the result of transmission of the confirmation data by the transmitting unit.

According to another aspect of the present invention, there is provided a communication device having a first connecting unit configured to connect to a network and a second connecting unit configured to connect to an information processing apparatus, the device including a receiving unit configured to receive data from the network through the first connecting unit, a processing unit configured to process the data received by the receiving unit, a rejection information registering unit configured to register rejection information indicating a first source, wherein the communication device is not allowed to process data received from the first source, a permission information registering unit configured to register permission information indicating a second source, wherein the communication device is allowed to process data received from the second source, a determining unit configured to, when the receiving unit receives data, determine whether information indicating a source of the received data is registered in either the rejection information registering unit or the permission information registering unit, a transmitting unit configured to, when the determining unit determines that the information indicating the source of the received data is not registered in either the permission information registering unit or the rejection information registering unit, transmit confirmation data to the information processing apparatus through the second connecting unit, and a control unit configured to allow the processing unit to process the received data in accordance with the result of transmission of the confirmation data by the transmitting unit.

Further features of the present invention will become apparent from the following description of exemplary embodiments with reference to the attached drawings.

BRIEF DESCRIPTION OF THE DRAWINGS

The accompanying drawings, which are incorporated into and constitute a part of the specification, illustrate embodiments of the invention and, together with the description, serve to explain principles of the invention.

FIG. 3 is a diagram illustrating a permission list 300 in accordance with the embodiment of the present invention.

FIG. 4 is a diagram illustrating a rejection list 400 in accordance with the embodiment of the present invention.

FIG. 9 is a flowchart showing the filtering process in accordance with the embodiment of the present invention.

DESCRIPTION OF THE EMBODIMENTS

Embodiments of the present invention will be described in detail below with reference to the drawings. The following embodiments are not intended to limit the present invention as defined by the claims, and all of combinations of features described in the embodiments are not necessarily indispensable for implementing the present invention.

A first embodiment of the present invention will now be described.

Figure 1:
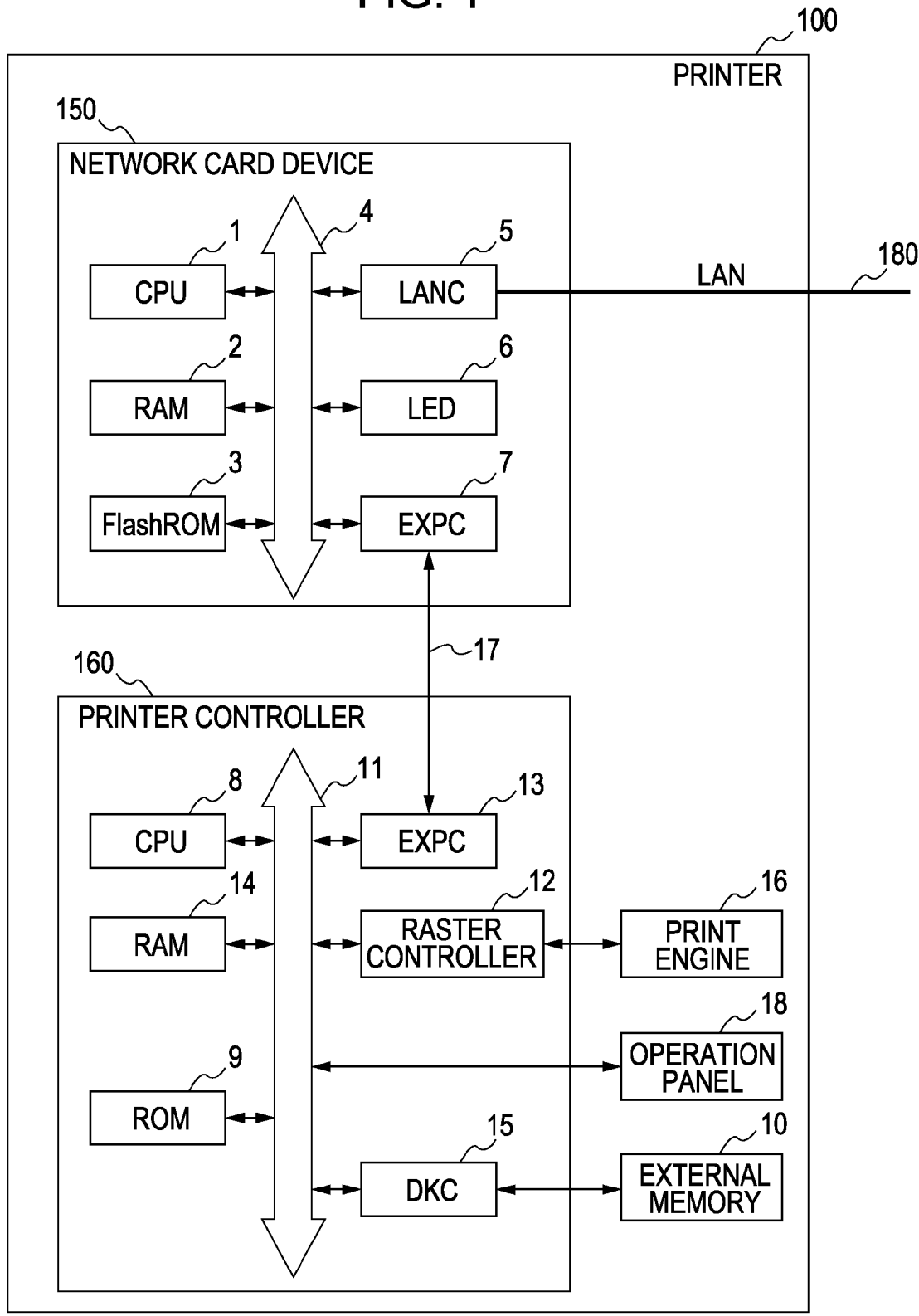
FIG. 1 is a block diagram illustrating the structure of a printer 100 and that of a network card device 150 according to an embodiment of the present invention.

FIG. 1 is a block diagram explaining the structure of a printer 100 in accordance with a first embodiment of the present invention. The printer 100 may broadly include a network card device 150 and a printer controller 160, serving as a control mechanism.

The network card device 150 may be a network device that is realized by an intelligent network card module and is detachable from the printer 100. The printer controller 160 controls the whole of the printer 100.

The printer 100 can include an external memory 10 including a hard disk connected to the printer controller 160, a print engine 16 for printing, and an operation panel (operation unit) 18.

The network card device 150 includes a CPU 1 for the network card device, a RAM 2, and a flash ROM 3, serving as a rewritable ROM. The network card device 150 further includes a network controller (i.e., a local area network controller which will be abbreviated to "LANC" hereinafter) 5, an LED 6, an expansion interface controller (hereinafter, abbreviated to "EXPC") 7, and a system bus 4 that connects those components to one another.

The CPU 1 reads out a control program stored in the flash ROM 3 and executes various control processes. For example, the CPU 1 communicates with an external apparatus (not shown), such as a host computer, connected to a local area network (LAN) 180 through the LANC 5 connected to the system bus 4 using a predetermined network communication protocol. Consequently, the CPU 1 performs centralized control on transmission and reception of various data blocks, e.g., print data and a printer control instruction transmitted from the external apparatus, thus performing appropriate data transfer control on the printer controller 160 connected through the EXPC 7 to the network card device 150.

The RAM 2 is used as a main memory and a temporal storage area, such as a work area, for the CPU 1. The LED 6 is used as an indicator that indicates an operation state of the network card device 150. The LED 6 can indicate various operation states, e.g., an electrical connection state (LINK) between the LANC 5 and the LAN 180 and a network communication mode (10 Base, 100 Base, full duplex, or half duplex) using, for example, LED colors and a blinking pattern.

The EXPC 7 functions as an interface to connect the network card device 150 to the printer controller 160 and includes a connector (not shown). The network card device 150 is detachable from the printer 100 (the printer controller 160) through the connector. The network card device 150 is attachable to another printer having the same structure as that of the printer 100.

The printer controller 160 can include a CPU 8 for the printer controller, a ROM 9, and a raster controller 12. The printer controller 160 may further include an expansion interface controller (EXPC) 13, a RAM 14, a disk controller (hereinafter, abbreviated to "DKC") 15, and a system bus 11 that connects those components to one another.

The CPU 8 may perform centralized control of access to/from various devices connected through the system bus 11 on the basis of a control program stored in the ROM 9 or a control program and resource data stored in the external memory 10 connected through the DKC 15.

In addition, the CPU 8 may allow the raster controller 12 to generate output image information on the basis of print data received from the network card device 150 through the EXPC 13 and output an image signal to the print engine 16.

The RAM 14 functions as a main memory and a work area for the CPU 8. The memory capacity of the RAM 14 can be expanded by an optional RAM connected to an expansion port (not shown).

The operation panel 18 can include buttons used for operations, e.g., setting an operation mode of the printer 100 and cancelling print data, and may further include a display unit, such as a liquid crystal panel or an LED, for indicating the operation state of the printer 100.

The print engine 16 functions as an image forming unit using a known printing technique. For example, electrophotography (laser-beam method), an ink-jet method, and a sublimation (thermal-transfer) method are available.

Figure 2:
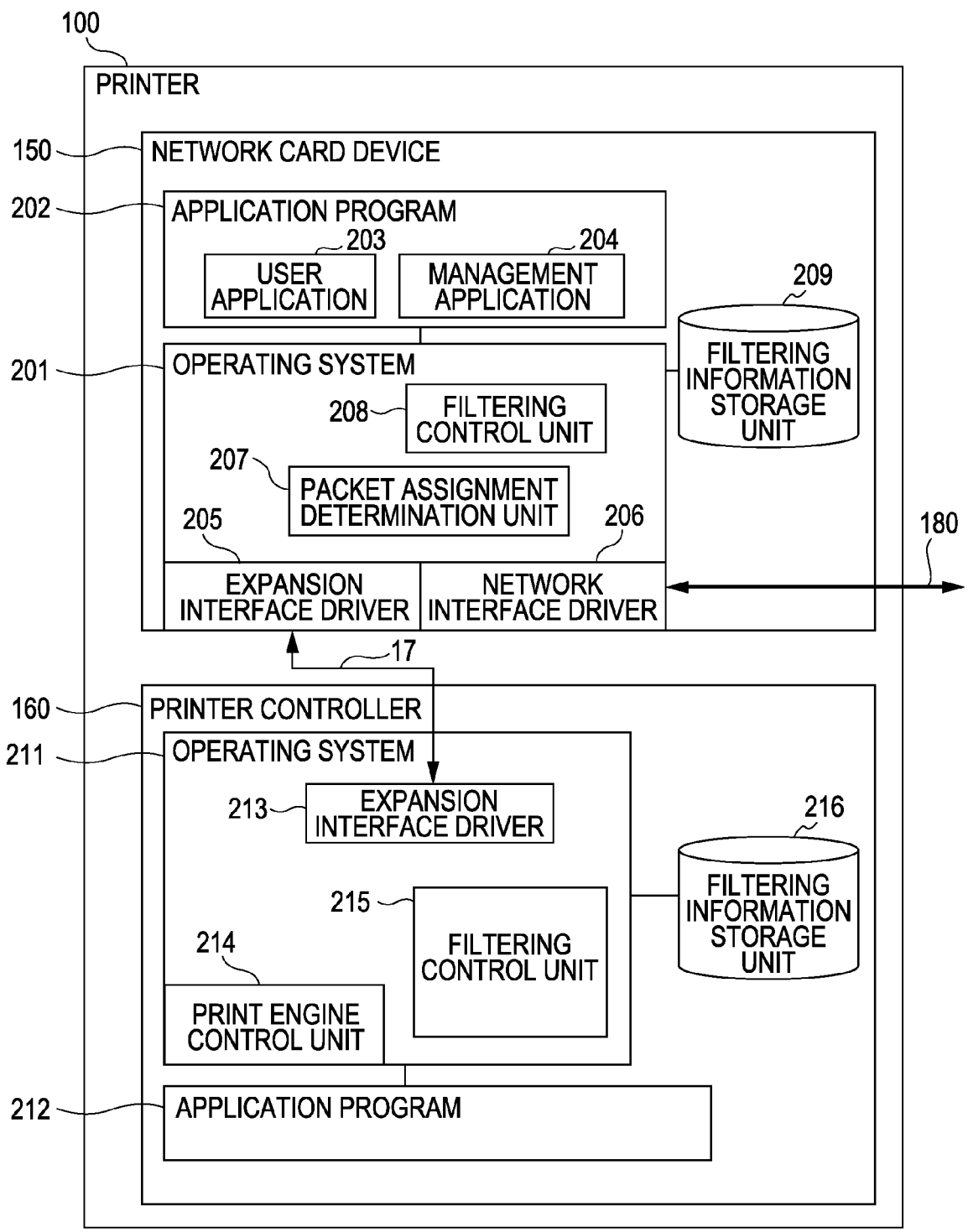
FIG. 2 is a diagram illustrating the software configuration of the printer 100 and that of the network card device 150 according to the embodiment of the present invention.

FIG. 2 is a block diagram illustrating an embodiment of the software configuration of a control program for the network card device 150 and the printer controller 160 in FIG. 1. The control program shown in FIG. 2 may be stored in the respective storage units (e.g., the flash ROM 3 and the ROM 9) of the network card device 150 and the printer controller 160, and may be executed by the respective CPUs 1 and 8.

In the network card device 150, an operating system (OS) 201 performs centralized control on input and output of basic data of the network card device 150. The OS 201 includes an expansion interface driver 205, a network interface driver 206, a packet assignment determination unit 207, and a filtering control unit 208.

The expansion interface driver 205 can control communication with the printer controller 160 through an expansion interface 17. The network interface driver 206 can communicate with the external apparatus (not shown), e.g., the host computer, via the LAN 180.

The packet assignment determination unit 207 can determine whether a packet received from the LAN 180 by the network interface driver 206 is intended for an application program 202 provided by the network card device 150 itself.

Specifically, in one embodiment, header information contained in the received packet is analyzed to obtain destination network information, such as a destination network address or a destination port number. Subsequently, socket information of a communication socket used by the application program 202 may be acquired to retrieve a socket corresponding to the destination network information, namely, to determine whether there is such a socket.

According to one embodiment, when such a socket exists, the packet assignment determination unit 207 determines that the received data is for the application program 202 and passes the received packet to the application program 202. Whereas, when there is no socket corresponding to the destination network information, the expansion interface driver 205 transfers the received packet to the printer controller 160 through the expansion interface 17.

The filtering control unit 208 may control data input and output to/from a filtering information storage unit 209 to control access to the application program 202 from an external apparatus.

The application program 202 includes a user application 203 and a management application 204 that run in the network card device 150. The user application 203 is an application that may be described in, for example, Java (registered trademark) language, which a user is free to install, and which provides additional expandability. The management application 204 is an application playing a role in installing or uninstalling the user application 203.

In the printer controller 160, an operating system (OS) 211 performs centralized control on various processes by the printer controller 160. The OS 211 includes an expansion interface driver 213, a print engine control unit 214, and a filtering control unit 215.

In the embodiment as shown, the expansion interface driver 213 controls communication with the network card device 150 through the expansion interface 17. The print engine control unit 214 controls communication with the print engine 16. The filtering control unit 215 may control data input and output to/from a filtering information storage unit 216 to control access to an application program 212 from an external apparatus. In one version, filtering information can be registered in the filtering information storage unit 216 through the operation panel 18.

The application program 212 may be capable of realizing various functions, such as a print processing function, of the printer controller 160. In addition, the application program 212 may have a function for registering various functional settings, e.g., network setting and filtering setting of the printer controller 160.

FIG. 3 illustrates an embodiment of a permission list 300 stored in the filtering information storage unit 209 of the network card device 150. The permission list 300 includes an IP address setting portion 301 and a MAC address setting portion 302. The IP address setting portion 301 stores IP addresses of external apparatuses that are permitted to access the application program 202. The MAC address setting portion 302 stores MAC addresses of external apparatuses that are permitted to access the application program 202.

FIG. 4 illustrates an embodiment of a rejection list 400 stored in the filtering information storage unit 209 of the network card device 150. The rejection list 400 includes an IP address setting portion 401 and a MAC address setting portion 402. The IP address setting portion 401 stores IP addresses of external apparatuses that are denied access to the application program 202. The MAC address setting portion 402 stores MAC addresses of external apparatuses that are denied access to the application program 202.

Figure 5:
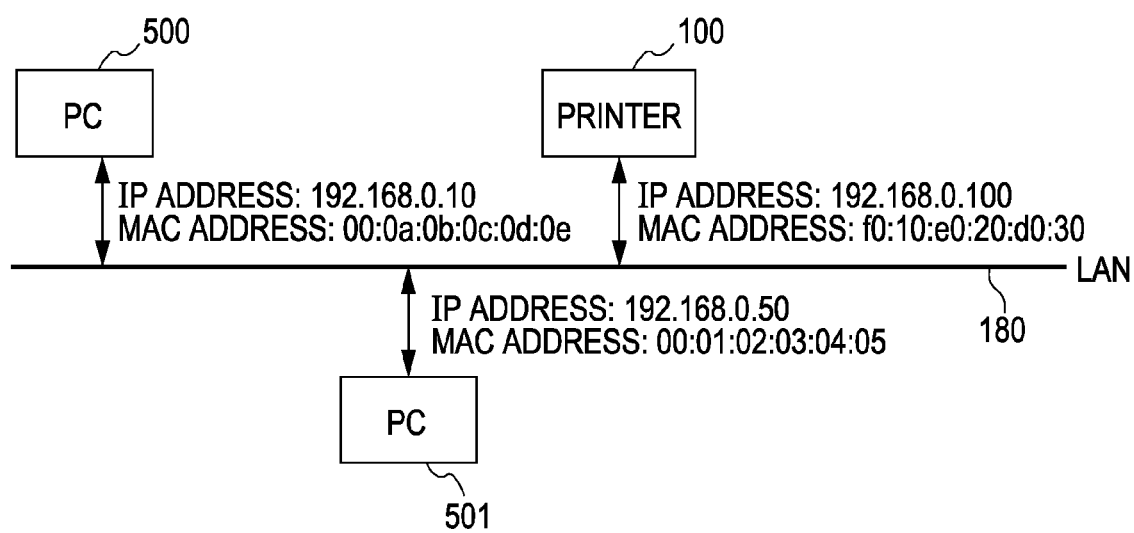
FIG. 5 is a diagram illustrating the whole of a system in accordance with the embodiment of the present invention.

FIG. 5 is a diagram illustrating an example of the entire structure of a network system in the present embodiment. The network system includes communication apparatuses, such as the printer 100 and personal computers (hereinafter, PCs) 500 and 501. The printer 100 and the PCs 500 and 501 are connected to the LAN 180 such that they can communicate with each other. The network card device 150 has been attached to the printer 100. The printer 100 includes the network card device 150 and the printer controller 160.

For the convenience of description, it is assumed that the respective communication apparatuses (the printer 100 and the PCs 500 and 501) connected to the LAN 180 communicate with each other using the TCP/IP protocol in the network system shown in FIG. 5.

In the present embodiment, it is assumed that an IP address of 192.168.0.100 and a MAC address of f0:10:e0:20:d0:30 are assigned to the printer 100 as shown in FIG. 5. Similarly, it is assumed that an IP address of 192.168.0.10 and a MAC address of 00:0a:0b:0c:0d:0e are assigned to the PC 500 and an IP address of 192.168.0.50 and a MAC address of 00:01:02:03:04:05 are assigned to the PC 501.

It is noted that the network connecting the printer 100 and the PCs 500 and 501 is not limited to the LAN 180 as shown. Rather, any communication network may be used.

In addition, it is assumed that a user, e.g., a network administrator, has already set filtering information in the filtering information storage unit 216 of the printer controller 160 included in the printer 100 through the operation panel 18.

In this case, it is assumed that the filtering information storage unit 216 has stored information indicating that the printer 100 is allowed to process data received from the PC 500 but the printer 100 is not allowed to process data received from the PC 501.

Figure 6:
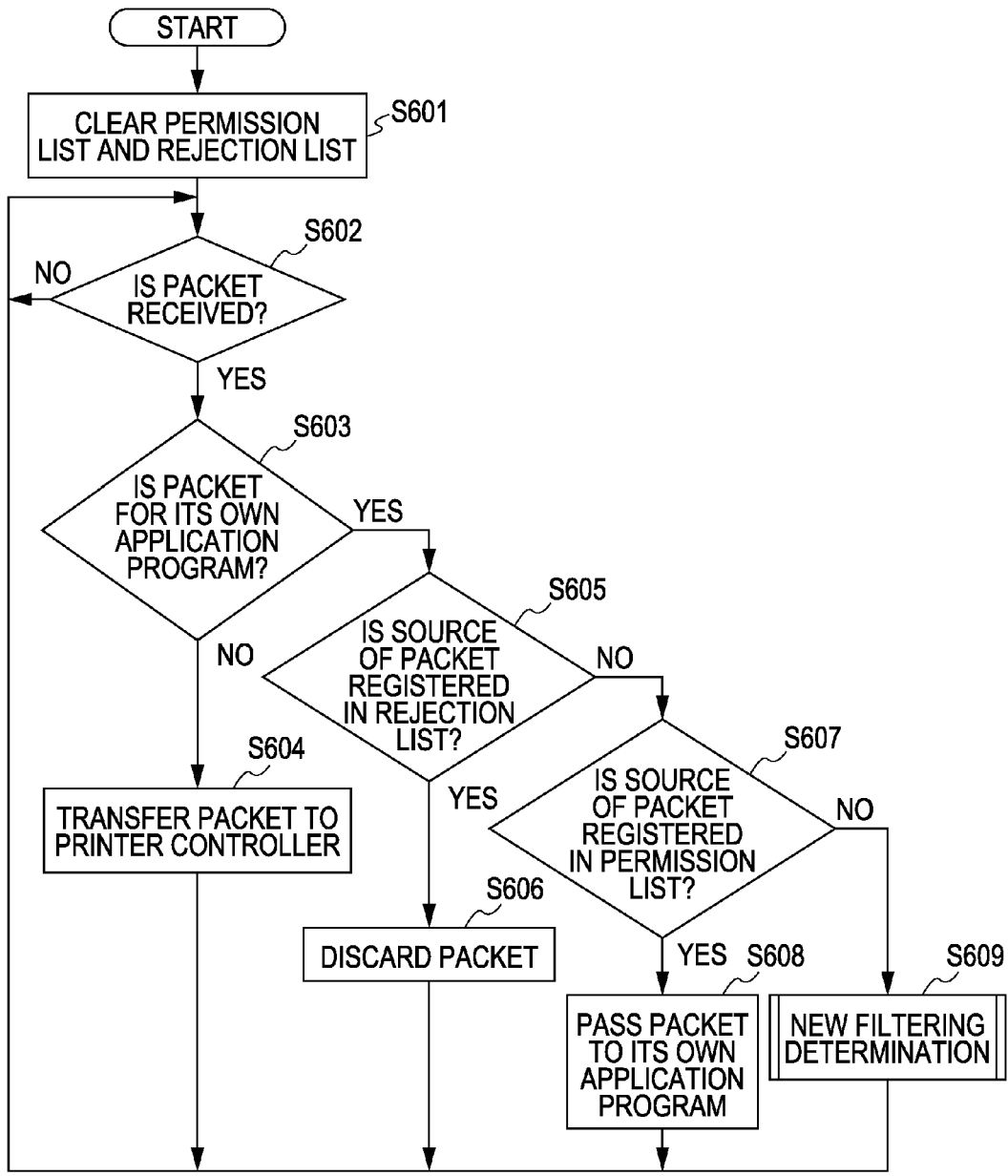
FIG. 6 is a flowchart showing a filtering process in accordance with the embodiment of the present invention.

FIG. 6 is a flowchart showing an example of a series of actions associated with a filtering process by the network card device 150 in the network system in FIG. 5. Respective processing steps S601 to S609 describe the flow of the filtering process executed by, for example, the network card device 150. A program corresponding to a control procedure including the respective steps may be stored in the flash ROM 3 of the network card device 150. The CPU 1 may read out and executes the program.

During startup processing just after power-on, the network card device 150 clears the contents of the permission list 300 and those of the rejection list 400 (step S601). Consequently, the filtering information storage unit 209 of the network card device 150 stores no filtering information.

In step S602, the network card device 150 waits for the network interface driver 206 to receive a communication packet from any apparatus on the LAN 180.

When a packet is received (YES in step S602), the process proceeds to step S603. In step S603, the packet assignment determination unit 207 determines whether the received packet is intended for the application program 202. When it is determined that the received packet is not for the application program 202 (NO in step S603), the received packet is transferred to the printer controller 160 through the expansion interface 17 in step S604. When the transfer is finished, the process returns to step S602 and the network card device 150 again waits for reception of a communication packet from any apparatus on the LAN 180.

After that, in the printer controller 160, the filtering control unit 215 refers to the filtering information storage unit 216 to determine how to process the transferred packet. For example, when a source of the received packet is the PC 500, the filtering control unit 215 passes the received packet to the application program 212. Whereas, when the source of the received packet is the PC 501, the filtering control unit 215 immediately discards the received packet without passing the packet to the application program 212.

When it is determined in step S603 that the received packet is for the application program 202 (YES in step S603), the process proceeds to step S605. A determination is made in step S605 as to whether the source of the received packet is registered in the rejection list 400. For example, header information contained in the received packet can be read out to extract a source IP address and a source MAC address. Subsequently, the IP address setting portion 401 and the MAC address setting portion 402 of the rejection list 400 are searched to determine whether information corresponding to the extracted source IP address and source MAC address is registered in the rejection list 400.

When the corresponding information is registered (YES in step S605), the received packet is discarded in step S606. After that, the process returns to step S602. Reception of a communication packet from any apparatus on the LAN 180 is again waited for.

When the corresponding information is not registered (NO in step S605), the process proceeds to step S607. A determination is made in step S607 as to whether the source of the received packet is registered in the permission list 300. For example, the IP address setting portion 301 and the MAC address setting portion 302 of the permission list 300 may be searched to determine whether information corresponding to the extracted source IP address and source MAC address is registered in the permission list 300.

When the corresponding information is registered (YES in step S607), the received packet is passed to the application program 202 in step S608. The process then returns to step S602. Reception of a communication packet from any apparatus on the LAN 180 is again waited for. When the corresponding information is not registered (NO in step S607), the process proceeds to step S609. In step S609, new determination for filtering (hereinafter, "new filtering determination") is performed.

In the case shown in the example of FIG. 6, a determination is made in step S605 as to whether the source of the received packet is registered in the rejection list 400. After that, a determination is made in step S607 as to whether the source of the received packet is registered in the permission list 300. However, the following procedure may also be used.

In other words, when it is determined in step S603 that the received packet is for the application program 202 (YES in step S603), the process may proceed not to step S605, but instead to step S607. A determination is made in step S607 as to whether the source of the received packet is registered in the permission list 300. When it is determined that the source of the received packet is registered in the permission list 300 (YES in step S607), the process proceeds to step S608.

On the other hand, when the source of the received packet is not registered in the permission list 300 (NO in step S607), the process may proceed to step S605. A determination is made in step S605 as to whether the source of the received packet is registered in the rejection list 400. When the source of the received packet is registered in the rejection list 400 (YES in step S605), the process proceeds to step S606. When the source of the received packet is not registered in the rejection list 400 (NO in step S605), the process proceeds to step S609.

Figure 7:
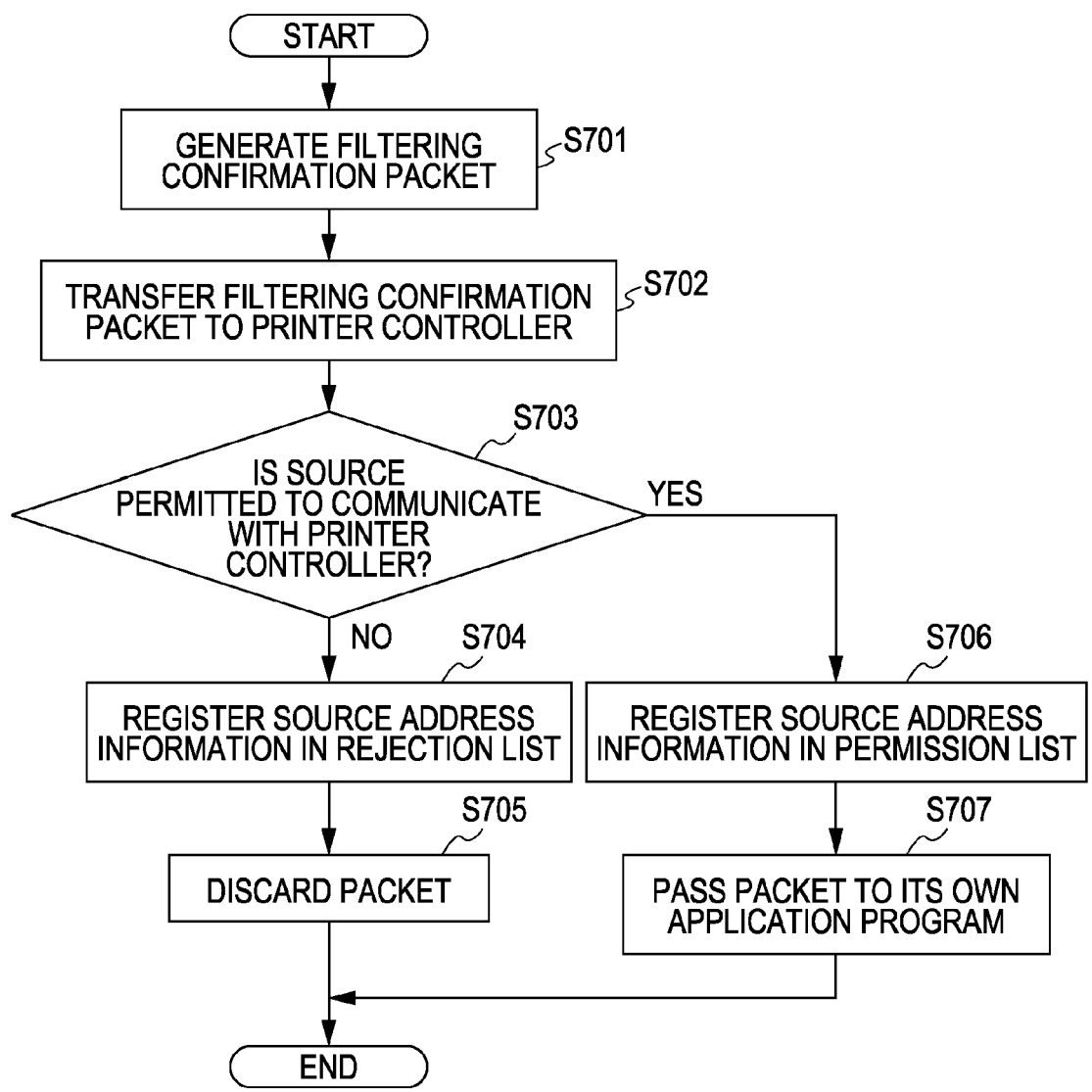
FIG. 7 is a flowchart showing the filtering process in accordance with the embodiment of the present invention.

FIG. 7 is a flowchart showing an example of a series of actions associated with a process for new filtering determination by the network card device 150. Processing steps S701 to S707 describe the flow of the new filtering determination process executed by the network card device 150. A program corresponding to a control procedure including the respective steps may be stored in the flash ROM 3 of the network card device 150. The CPU 1 reads out and executes the program.

First, the network card device 150 generates a filtering confirmation packet (step S701). Any filtering confirmation packet may be used so long as the packet conforms to a communication protocol of the printer controller 160. In the present embodiment, an Internet Control Message Protocol (ICMP) ECHO packet is used as a filtering confirmation packet.

In this embodiment, to generate an ICMP ECHO packet, the PI address of 192.168.0.100 of the printer 100 is set as a destination IP address and the MAC address of f0:10:e0:20: d0:30 thereof is set as a destination MAC address.

In addition, the source IP address and the source MAC address, extracted in the flowchart of FIG. 6, of the received packet may be set as a source IP address and a source MAC address. For example, when the received packet is a packet transmitted from the PC 500, header information contained in an ICMP ECHO packet, serving as the filtering confirmation packet, includes a source IP address of 192.168.0.10 and a source MAC address of 00:0a:0b:0c:0d:0e as source information. Alternatively, when the received packet is a packet transmitted from the PC 501, the header information includes a source IP address of 192.168.0.50 and a source MAC address of 00:01:02:03:04:05 as source information.

In step S702, the ICMP ECHO packet is transferred to the printer controller 160 through the expansion interface 17.

After that, a determination is made in step S703 as to whether the filtering confirmation packet has normally been transferred to the printer controller 160. More specifically, in the present embodiment, a determination is made as to whether a REPLY packet has been returned from the printer controller 160 through the expansion interface 17 in response to the ICMP ECHO packet within a predetermined period.

When no REPLY packet is returned in response to the ICMP ECHO packet within the predetermined period (NO in step S703), the process proceeds to step S704. In step S704, the source information of the received packet is registered in the rejection list 400. More specifically, the source IP address of the received packet is registered in the IP address setting portion 401 of the rejection list 400 and the source MAC address is registered in the MAC address setting portion 402.

The received packet is discarded (step S705) and the process then terminates.

Whereas, when it is determined in step S703 that the REPLY packet has been returned within the predetermined period (YES in step S703), the process proceeds to step S706. The source information of the received packet is registered in the permission list 300. More specifically, the source IP address of the received packet is registered in the IP address setting portion 301 of the permission list 300 and the source MAC address is registered in the MAC address setting portion 302.

In step S707, the received packet is supplied to the application program 202. The process then terminates.

An embodiment of the process for new filtering determination in step S609 in FIG. 6 has been described. In the flowchart of FIG. 6, the above-described new filtering determination is performed in step S609 and, after that, the process returns to step S602. Reception of a communication packet from any apparatus on the LAN 180 is again waited for.

According to the above-described first embodiment, when the received packet is not for the application program of the network card device 150, the network card device 150 transfers the packet to the printer controller 160. The printer controller 160 performs filtering on the received packet on the basis of the filtering information stored in the printer controller 160.

Whereas, when receiving a packet that is for the application program of the network card device 150, the network card device 150 generates a confirmation packet including source information of the packet. After that, the network card device 150 checks using the confirmation packet whether a communication terminal, serving as the source of the received packet, is permitted to communicate with the printer controller 160, thereby determining whether the received packet can be processed by the network card device 150 or should be discarded.

Consequently, the network card device 150 can perform filtering similar to that by the printer controller 160 on the basis of the filtering information set in the printer controller 160. In addition, since the confirmation packet is generated using the ICMP protocol which the printer controller 160 supports as a standard feature, it may be unnecessary for the printer controller 160 to have special supports for the present embodiment. The above-described first embodiment may provide a communication device that transmits confirmation data to an information processing apparatus and processes received data in accordance with the result of transmission of the confirmation data.

A second embodiment of the present invention will now be described.

Hardware configuration and software configuration in the second embodiment do not differ from those in the above-described first embodiment. Accordingly, explanation of those configurations is omitted. In addition, the structure of a network system in the second embodiment does not differ from that in the above-described first embodiment.

Figure 8:
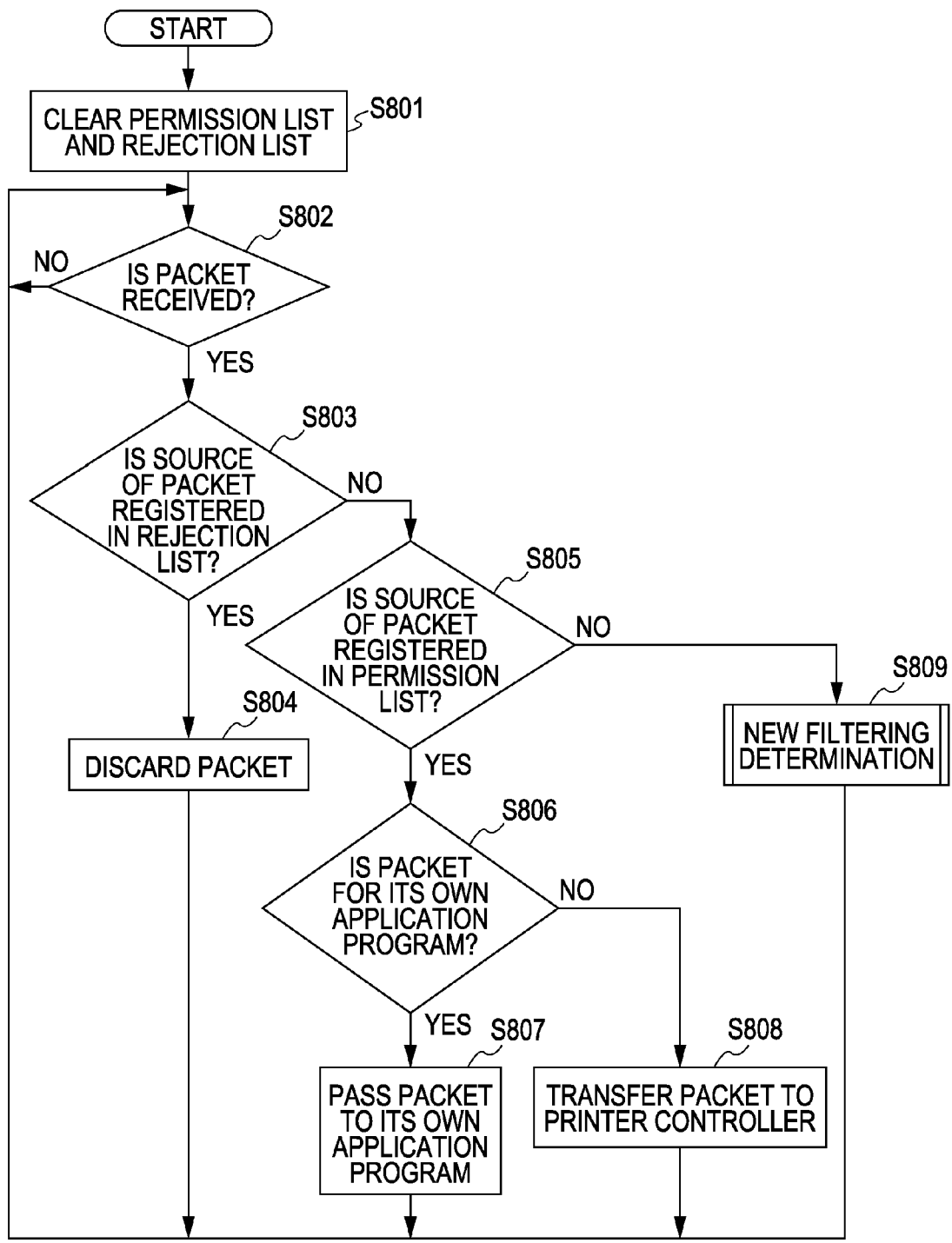
FIG. 8 is a flowchart showing a filtering process in accordance with another embodiment of the present invention.

FIG. 8 is a flowchart showing an example of a series of actions associated with a filtering process by the network card device 150 in the second embodiment. Respective processing steps S801 to S809 describe the flow of the filtering process executed by the network card device 150. A program corresponding to a control procedure including the respective steps may be stored in the flash ROM 3 of the network card device 150. The CPU 1 may read out and execute the program.

During startup processing just after power-on, the network card device 150 clears the contents of the permission list 300 and those of the rejection list 400 (step S801). Accordingly, the filtering information storage unit 209 of the network card device 150 stores no filtering information.

In step S802, the network card device 150 waits for the network interface driver 206 to receive a communication packet from any apparatus on the LAN 180.

When a packet is received (YES in step S802), the process proceeds to step S803. A determination is made in step S803 as to whether a source of the received packet is registered in the rejection list 400. For example, header information contained in the received packet may be read out to extract a source IP address and a source MAC address. Subsequently, the IP address setting portion 401 and the MAC address setting portion 402 of the rejection list 400 may be searched to determine whether information corresponding to the extracted source IP address and source MAC address is registered in the rejection list 400.

When the corresponding information is registered (YES in step S803), the received packet is discarded in step S804. After that, the process returns to step S802. Reception of a communication packet from any apparatus on the LAN 180 is again waited for.

When the corresponding information is not registered (NO in step S803), the process proceeds to step S805. A determination is made in step S805 as to whether the source of the received packet is registered in the permission list 300. For example, the IP address setting portion 301 and the MAC address setting portion 302 of the permission list 300 may be searched to determine whether information corresponding to the extracted source IP address and source MAC address is registered in the permission list 300.

When the corresponding information is registered (YES in step S805), the process proceeds to step S806. The packet assignment determination unit 207 determines whether the received packet is intended for the application program 202.

When it is determined that the received packet is for the application program 202 (YES in step S806), the process proceeds to step S807. The received packet is passed to the application program 202. After that, the process returns to step S802. Reception of a communication packet from any apparatus on the LAN 180 is again waited for.

When it is determined in step S806 that the received packet is not for the application program 202 (NO in step S806), the received packet is transferred to the printer controller 160 through the expansion interface 17 in step S808. When the transfer is finished, the process returns to step S802. Reception of a communication packet from any apparatus on the LAN 180 is again waited for.

On the other hand, when it is determined in step S805 that the source of the received packet is not registered in the permission list 300 (NO in step S805), the process proceeds to step S809. In step S809, new filtering determination is performed.

In this case shown in the example of FIG. 8, a determination is made in step S803 as to whether the source of the received packet is registered in the rejection list 400. After that, a determination is made in step S805 as to whether the source of the received packet is registered in the permission list 300. However, the following procedure may also be used.

In other words, when a packet is received in step S802, the process may proceed not to step S803, but instead to step S805. A determination is made in step S805 as to whether the source of the received packet is registered in the permission list 300. When it is determined that the source of the received packet is registered in the permission list 300 (YES in step S805), the process proceeds to step S806.

Whereas, when the source of the received packet is not registered in the permission list 300 (NO in step S805), the process proceeds to step S803. A determination is made as to whether the source of the received packet is registered in the rejection list 400. When the source of the received packet is registered in the rejection list 400 (YES in step S803), the process proceeds to step S804. When the source is not registered in the list 400 (NO in step S803), the process proceeds to step S809.

FIG. 9 is a flowchart showing an example of a series of actions associated with a process for new filtering determination by the network card device 150 in the second embodiment. Processing steps S901 to S909 describe the flow of the new filtering determination process executed by the network card device 150. A program corresponding to a control procedure including the respective steps may be stored in the flash ROM 3 of the network card device 150. The CPU 1 reads out and executes the program.

First, the network card device 150 generates a filtering confirmation packet (step S901). Any filtering confirmation packet may be used so long as the packet conforms to a communication protocol of the printer controller 160. In the second embodiment, an ICMP ECHO packet is used as a filtering confirmation packet.

In this embodiment, information regarding the printer 100 is set as a destination IP address and a destination MAC address of the ICMP ECHO packet in the same way as the first embodiment. In addition, the source IP address and the source MAC address, extracted in the flowchart of FIG. 8, of the received packet are set as a source IP address and a source MAC address.

In step S902, the ICMP ECHO packet is transferred to the printer controller 160 through the expansion interface 17.

After that, a determination is made in step S903 as to whether the filtering confirmation packet has normally been transferred to the printer controller 160. For example, in the second embodiment, a determination is made as to whether a REPLY packet has been returned from the printer controller 160 through the expansion interface 17 in response to the ICMP ECHO packet within a predetermined period.

When no REPLY packet is returned in response to the ICMP ECHO packet within the predetermined period (NO in step S903), the process proceeds to step S904. In step S904, the source information of the received packet is registered in the rejection list 400. For example, the source IP address of the received packet is registered in the IP address setting portion 401 of the rejection list 400 and the source MAC address is registered in the MAC address setting portion 402.

Subsequently, the received packet is discarded (step S905) and the process then terminates.

On the other hand, when it is determined in step S903 that the REPLY packet has been returned within the predetermined period (YES in step S903), the process proceeds to step S906. The source information of the received packet is registered in the permission list 300. For example, the source IP address of the received packet is registered in the IP address setting portion 301 of the permission list 300 and the source MAC address is registered in the MAC address setting portion 302.

Subsequently, the process proceeds to step S907. The packet assignment determination unit 207 determines whether the received packet is intended for the application program 202.

When the received packet is for the application program 202 (YES in step S907), the process proceeds to step S908. The received packet is passed to the application program 202 and the process then terminates.

Whereas, when the received packet is not for the application program 202 (NO in step S907), the process proceeds to step S909. The received packet is transferred to the printer controller 160 through the expansion interface 17 and the process then terminates.

The process for new filtering determination in step S809 in the example of FIG. 8 has been described. In the flowchart of FIG. 8, the above-described new filtering determination is performed in step S809 and, after that, the process returns to step S802. Reception of a communication packet from any apparatus on the LAN 180 is again waited for.

According to the second embodiment, the following advantages can be obtained in addition to the advantages of the first embodiment. In other words, in the second embodiment, the network card device 150 performs filtering on a received packet intended for the printer controller 160. This results in a decrease in transfer of a communication packet to the printer controller 160 from an apparatus which is denied communication with the printer controller 160. Consequently, the printer controller 160 can be prevented from being subjected to a processing load caused by an unnecessary communication packet.

A third embodiment of the present invention will now be described.

As for the filtering confirmation packet used in the foregoing first and second embodiments, it may be unnecessary to use an ICMP ECHO packet. A packet conforming to any of various standard protocols supported by the printer controller 160 may be used.

For example, a Hypertext Transfer Protocol (HTTP) packet a File Transfer Protocol (FTP) packet may be used as the above-described filtering confirmation packet.

For example, when an HTTP packet is used, the network card device 150 tries to establish a session with an HTTP server of the printer controller 160 using the printer 100 as a transmission destination and the source of the received packet as a source.

When the session is established, the network card device 150 then transmits an HTTP GET method to the printer controller 160.

When the network card device 150 receives a response to the GET method from the printer controller 160, the network card device 150 determines that the source of the received packet is permitted to communicate with the printer 100.

Whereas, when the session with the HTTP server of the printer controller 160 is not established, the network card device 150 determines that the source of the received packet is denied communication with the printer 100. Alternatively, when the session is established but a response to the GET method is not returned, the network card device 150 also determines that the source of the received packet is denied communication with the printer 100.

Similarly, when a FTP packet is used, the network card device 150 tries to establish a session with an FTP server of the printer controller 160 using the printer 100 as a transmission destination and the source of the received packet as a source.

When an OK response indicating that the session is established is returned from the printer controller 160, the network card device 150 determines that the source of the received packet is permitted to communicate with the printer 100.

Whereas, when an NG response indicating that the session request is rejected is returned from the printer controller 160, the network card device 150 determines that the source of the received packet is denied communication with the printer 100.

In the first to third embodiments, the network card device 150 may be physically separated from the printer 100. In this case, the printer 100 has therein a control unit for controlling a control mechanism including the printer controller 160.

In the network card device 150, the EXPC 7 in FIG. 1 may be a second network controller connected to the system bus 4. In the printer controller 160, the EXPC 13 in FIG. 1 may be a second network controller connected to the system bus 11. In this case, the expansion interface 17 functions as a second local area network. In addition, the network card device 150 and the printer controller 160 are connected to the second local area network.

In the above-described first to third embodiments, the filtering process using both of an IP address and a MAC address has been described as an example. Also, only one type of those addresses may be used. In addition, information other than an IP address or a MAC address may also be used so long as the information can be used to identify a corresponding apparatus.

The embodiments of the present invention have been described in detail above. The present invention can also take the form of an embodiment as, for example, a system, apparatus, method, program, or storage medium (recording medium). Specifically, the present invention is applicable to a system including a plurality of devices or an apparatus including a single device.

The present invention can also be achieved by supplying a software program storing computer-executable instructions (corresponding to the flowcharts shown in the drawings in the embodiments) for implementing the functions of the above-described embodiments to a system or apparatus directly or from a remote place, and allowing a computer of the system or apparatus to read out and execute the supplied program code.

Accordingly, the program code itself installed in the computer to implement the functional processing of the present invention by the computer may also implement aspects of the present invention. In other words, aspects of the present invention may include the computer program itself for implementing the functional processing of the present invention.

In this case, the program can take any form, for example, an object code, a program executed by an interpreter, or script data to be supplied to an OS, provided that the program has program functions.

Examples of a recording medium for supplying the program may include, but are not limited to, a flexible disk, hard disk, optical disk, magneto-optical disk, MO, CD-ROM, CD-R, CD-RW, magnetic tape, nonvolatile memory card, ROM, and DVD, such as DVD-ROM or DVD-R.

The program can also be supplied by downloading the program from a website on the Internet to a recording medium, such as a hard disk, using the browser of a client computer. Specifically, the computer program of the present invention may be supplied by connecting to the website and downloading the program itself or a compressed file including an automatic installation function from the website. It is also possible to divide the program code, constituting the program of the present invention, into a plurality of files, and download the individual files from different websites. In other words, the present invention may also include a WWW server that allows a plurality of users to download program files for implementing the functional processing of the present invention by a computer.

In addition, the program according to aspects of the present invention can be encrypted and be stored in a computer-readable storage medium, such as a CD-ROM. The storage media containing the encrypted program can be distributed to users. In this case, a user who has cleared predetermined conditions is allowed to download key information for decryption from a website over the Internet. The user can implement the functional processing of the present invention by executing the encrypted program using the key information and installing the program in the computer.

The functions of the above-described embodiments may be implemented by executing the read-out program by a computer. In addition, the functions of the above-described embodiments may be implemented by allowing an OS running on the computer to perform part or the whole of actual processing on the basis of instructions of the program.

Furthermore, the functions of the above-described embodiments may be implemented by writing the program read out from the recording medium in a memory provided for a function expansion board incorporated in the computer, or a function expansion unit connected to the computer. In other words, the functions of the embodiments may be implemented by allowing a CPU in the function expansion board or the function expansion unit to perform part or the whole of actual processing on the basis of instructions of the program.

While the present invention has been described with reference to exemplary embodiments, it is to be understood that the invention is not limited to only the exemplary embodiments disclosed herein. The scope of the following claims is to be accorded the broadest interpretation so as to encompass all modifications and equivalent structures and functions.

This application claims the benefit of Japanese Application No. 2007-328728 filed Dec. 20, 2007, which is hereby incorporated by reference herein in its entirety.

What is claimed is:

1. A network card device having a first connecting unit configured to connect to a network and a second connecting unit configured to connect to an information processing apparatus, the device comprising:
   a receiving unit configured to receive data from the network through the first connecting unit;
   a processing unit configured to process the data received by the receiving unit;
   a rejection information registering unit configured to register rejection information indicating a specific source, wherein the network card device is not allowed to process data received from the specific source;
   a determining unit configured to, when the receiving unit receives data, determine whether information indicating a source of the received data is registered in the rejection information registering unit;
   a transmitting unit configured to, when the determining unit determines that the information indicating the source of the received data is not registered in the rejection information registering unit, transmit confirmation data to the information processing apparatus through the second connecting unit; and
   a control unit configured to allow the processing unit to process the received data in accordance with the result of transmission of the confirmation data by the transmitting unit.

2. The device according to claim 1, wherein when the determining unit determines that the information indicating the source of the received data is registered in the rejection information registering unit, the control unit discards the received data without allowing the processing unit to process the received data.

3. The device according to claim 1, wherein when transmission of the confirmation data by the transmitting unit fails, the control unit discards the received data without allowing the processing unit to process the received data.

4. The device according to claim 1, wherein when transmission of the confirmation data by the transmitting unit fails, the rejection information registering unit newly registers the information indicating the source of the received data.

5. The device according to claim 1, wherein when transmission of the confirmation data by the transmitting unit succeeds, the control unit allows the processing unit to process the received data.

6. The device according to claim 1, further comprising:
   a permission information registering unit configured to register permission information indicating an other source, wherein the network card device is allowed to process data received from the other source, wherein when the information indicating the source of the received data is registered in the permission information registering unit, the control unit allows the processing unit to process the received data regardless of whether the information indicating the source of the received data is registered in the rejection information registering unit.

7. The device according to claim 6, wherein when transmission of the confirmation data by the transmitting unit succeeds, the permission information registering unit newly registers the information indicating the source of the received data.

8. The device according to claim 1, further comprising:
   a generating unit configured to generate the confirmation data to be transmitted by the transmitting unit, wherein upon generating the confirmation data, the generating unit sets the information processing apparatus as a destination of the confirmation data and the source of the received data as a source of the confirmation data.

9. The device according to claim 1, further comprising:
   a judging unit configured to, when a normal response to the confirmation data is returned from the information processing apparatus, judge that transmission of the confirmation data has succeeded, and when the normal response to the confirmation data is not returned from the information processing apparatus, judge that the transmission of the confirmation data has failed.

10. The device according to claim 1, further comprising:
    a transfer unit configured to, when a destination of the received data is the information processing apparatus, transfer the received data to the information processing apparatus irrespective of the source of the received data.

11. The device according to claim 1, further comprising:
    a transfer unit configured to, when a destination of the received data is the information processing apparatus, transfer the received data to the information processing apparatus in accordance with the result of determination by the determining unit.

12. The device according to claim 11, wherein the transfer unit further transfers the received data to the information processing apparatus in accordance with the result of transmission of the confirmation data.

13. A network card device having a first connecting unit configured to connect to a network and a second connecting unit configured to connect to an information processing apparatus, the device comprising:
    a receiving unit configured to receive data from the network through the first connecting unit;
    a processing unit configured to process the data received by the receiving unit;
    a permission information registering unit configured to register permission information indicating a specific source, wherein the network card device is allowed to process data received from the specific source;
    a determining unit configured to, when the receiving unit receives data, determine whether information indicating a source of the received data is registered in the permission information registering unit;
    a transmitting unit configured to, when the determining unit determines that the information indicating the source of the received data is not registered in the permission information registering unit, transmit confirmation data to the information processing apparatus through the second connecting unit; and
    a control unit configured to allow the processing unit to process the received data in accordance with the result of transmission of the confirmation data by the transmitting unit.

14. The device according to claim 13, wherein when the determining unit determines that the information indicating the source of the received data is registered in the permission information registering unit, the control unit allows the processing unit to process the received data.

15. The device according to claim 13, wherein when transmission of the confirmation data by the transmitting unit succeeds, the control unit allows the processing unit to process the received data.

16. The device according to claim 13, wherein when transmission of the confirmation data by the transmitting unit succeeds, the permission information registering unit newly registers the information indicating the source of the received data.

17. The device according to claim 13, wherein when transmission of the confirmation data by the transmitting unit fails, the control unit discards the received data without allowing the processing unit to process the received data.

18. The device according to claim 13, further comprising:
a rejection information registering unit configured to register rejection information indicating an other source, wherein the network card device is not allowed to process data received from the other source, wherein
when the information indicating the source of the received data is registered in the rejection information registering unit, the control unit discards the received data without allowing the processing unit to process the received data regardless of whether the information indicating the source of the received data is registered in the permission information registering unit.

19. The device according to claim 18, wherein when transmission of the confirmation data by the transmitting unit fails, the rejection information registering unit newly registers the information indicating the source of the received data.

20. A network card device having a first connecting unit configured to connect to a network and a second connecting unit configured to connect to an information processing apparatus, the device comprising:
a receiving unit configured to receive data from the network through the first connecting unit;
a processing unit configured to process the data received by the receiving unit;
a rejection information registering unit configured to register rejection information indicating a first source, wherein the network card device is not allowed to process data received from the first source;
a permission information registering unit configured to register permission information indicating a second source, wherein the network card device is allowed to process data received from the second source;
a determining unit configured to, when the receiving unit receives data, determine whether information indicating a source of the received data is registered in either the rejection information registering unit or the permission information registering unit;
a transmitting unit configured to, when the determining unit determines that the information indicating the source of the received data is not registered in either the permission information registering unit or the rejection information registering unit, transmit confirmation data to the information processing apparatus through the second connecting unit; and
a control unit configured to allow the processing unit to process the received data in accordance with the result of transmission of the confirmation data by the transmitting unit.

21. A method of controlling a network card device having a first connecting unit configured to connect to a network and a second connecting unit configured to connect to an information processing apparatus, the method comprising:
receiving data from the network through the first connecting unit;
processing the received data;
registering rejection information indicating a specific source, wherein the network card device is not allowed to process data received from the specific source;
determining, when data is received, whether information indicating a source of the received data is registered in the rejection information;
transmitting, when it is determined that the information indicating the source of the received data is not registered in the rejection information, confirmation data to the information processing apparatus through the second connecting unit; and
allowing the received data to be processed in accordance with the result of transmission of the confirmation data.

22. A method of controlling a network card device having a first connecting unit configured to connect to a network and a second connecting unit configured to connect to an information processing apparatus, the method comprising:
receiving data from the network through the first connecting unit;
processing the received data;
registering permission information indicating a specific source, wherein the network card device is allowed to process data received from the specific source;
determining, when data is received, whether information indicating a source of the received data is registered in the permission information;
transmitting, when it is determined that the information indicating the source of the received data is not registered in the permission information, confirmation data to the information processing apparatus through the second connecting unit; and
allowing the received data to be processed in accordance with the result of transmission of the confirmation data.

23. A method of controlling a network card device having a first connecting unit configured to connect to a network and a second connecting unit configured to connect to an information processing apparatus, the method comprising:
receiving data from the network through the first connecting unit;
processing the received data;
registering rejection information indicating a first source, wherein the network card device is not allowed to process data received from the first source;
registering permission information indicating a second source, wherein the network card device is allowed to process data received from the second source;
determining, when data is received, whether information indicating a source of the received data is registered in either the rejection information or the permission information;
transmitting, when it is determined that the information indicating the source of the received data is not registered in either the rejection information or the permission information, confirmation data to the information processing apparatus through the second connecting unit; and
allowing the received data to be processed in accordance with the result of transmission of the confirmation data.

* * * * *